United States Patent [19]

Stahel

[11] 4,146,279
[45] Mar. 27, 1979

[54] BOAT SEAT COOLER

[76] Inventor: Patrick E. Stahel, 300 W. 96th St., Bloomington, Minn. 55420

[21] Appl. No.: 821,528

[22] Filed: Aug. 3, 1977

[51] Int. Cl.² .................... A47B 83/00; F25D 23/12
[52] U.S. Cl. ..................................... 312/235 R; 9/7; 62/261; D6/64; D7/77
[58] Field of Search ................. 312/235 R, 235 A; 62/261; 220/9 F; D7/77; D6/64; 297/192, 193; 9/7

[56] References Cited

U.S. PATENT DOCUMENTS

| D. 17,375 | 6/1887 | Lueders | D6/64 |
| D. 101,895 | 11/1936 | Stoddard | D6/64 |
| D. 151,662 | 11/1948 | Smead | 312/235 R |
| D. 210,795 | 4/1968 | Birger et al. | D7/77 |
| 1,924,494 | 8/1933 | Gelinas | D7/77 |
| 3,099,482 | 7/1963 | Woodruff, Sr. | 312/235 R |
| 3,871,043 | 3/1975 | Davidson et al. | 9/7 |

Primary Examiner—Mervin Stein
Assistant Examiner—Alex Grosz
Attorney, Agent, or Firm—Norman P. Friederichs

[57] ABSTRACT

Disclosed is a cooler including a pair of laterally spaced storage compartments interconnected at their upper portions by an intermediate planar member. Each compartment may include a closure such as a pivotal door. The cooler may have an additional removable compartment for drawer-like mounting between the laterally spaced compartments.

10 Claims, 6 Drawing Figures

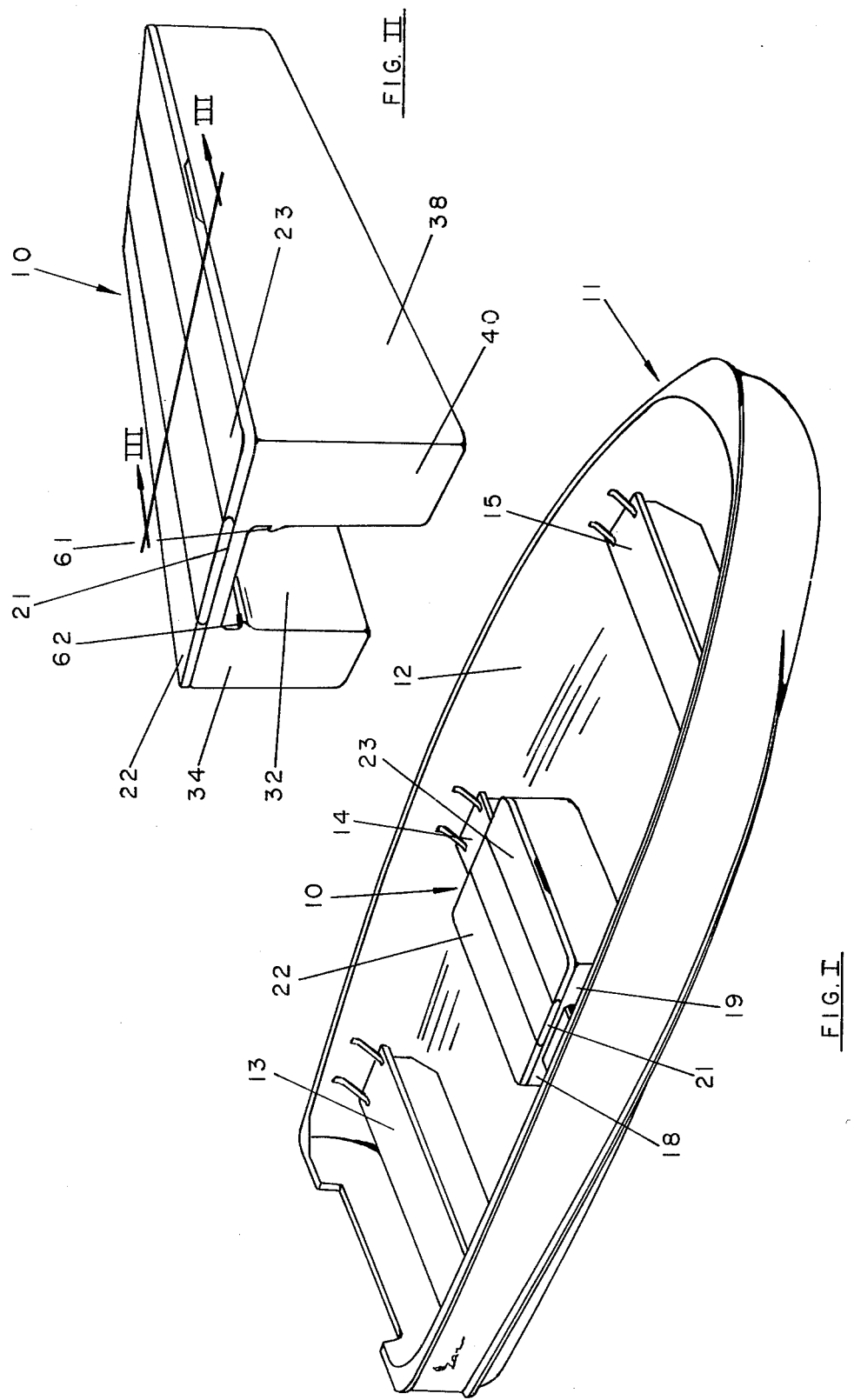

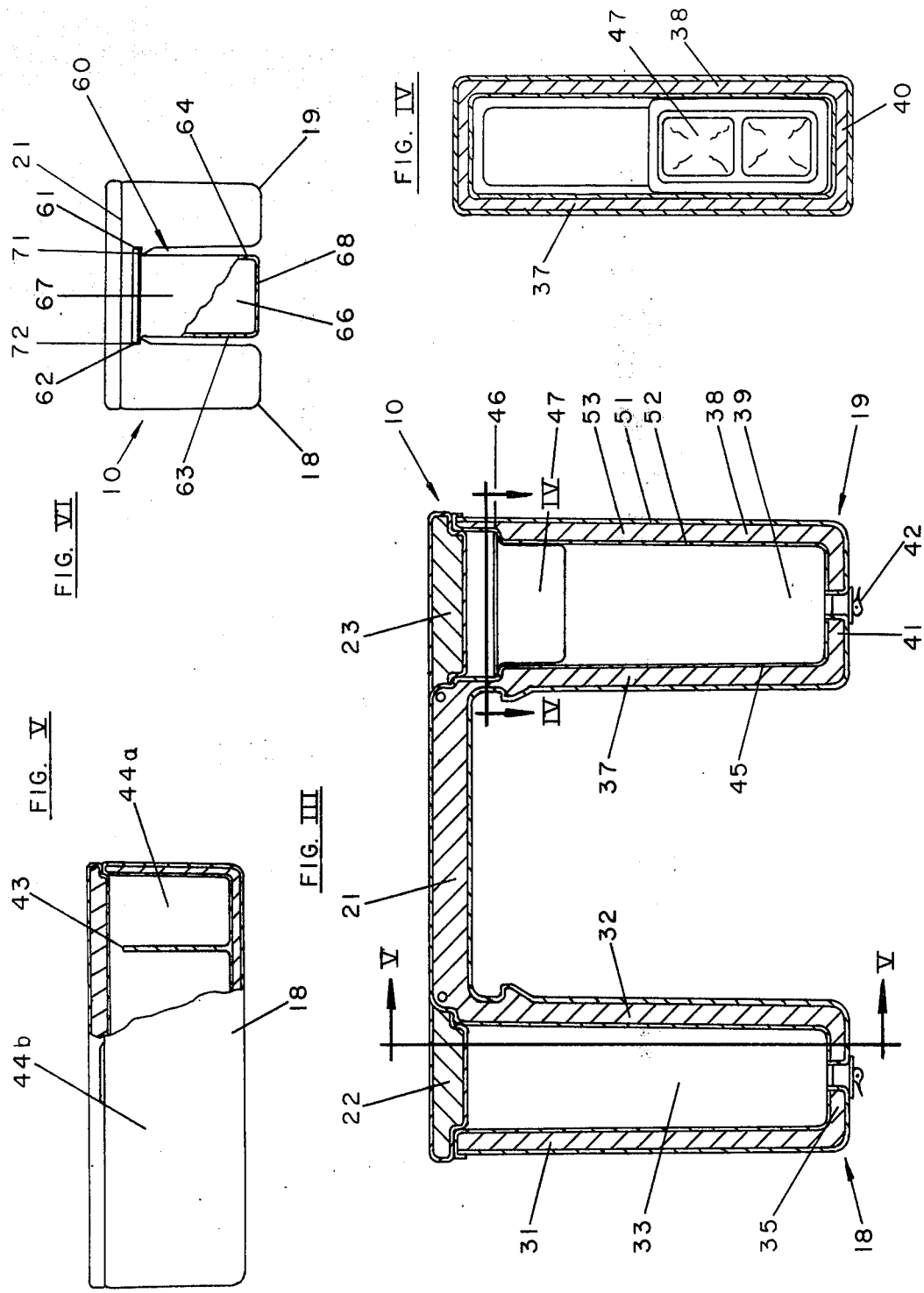

BOAT SEAT COOLER

BACKGROUND OF THE INVENTION

The present invention relates to coolers and more particularly to a cooler adapted for use in conjunction with platform-type seats.

A wide variety of coolers have been available to the consumer in the past. The most common type has been the conventional chest picnic cooler, typically including a bottom, four sides and a top. The top may be hinged or snapped in place. The chest-type cooler will typically include a pair of handles one disposed at either end for easy handling. Often, such a cooler will include a stopcock or drain at the bottom for easy removal of any water that may accumulate in the chest. Such picnic coolers are normally placed in use by inserting a block of ice or a bag of ice cubes therein and subsequently placing food materials such as beverages, meats and the like in the chest.

The known cooler chests are convenient for use in most environments. When going on a picnic, such chests are often placed in the trunk or back seat of an automobile during travel to the picnic and subsequently placed on or near a picnic table for use. Coolers are generally light weight and easy to carry; however, some coolers have been proposed which are built into travel trailers and boats. The built-in coolers typically are not portable but rather remain in place during and in between uses.

Although chest-type coolers serve a very important function in recreational eating and drinking activities, there are instances in which they create substantial interference with other recreational activities. One such instance is use of a chest-type cooler in a conventional fishing boat. One may for example, place the chest-type cooler on the floor of a boat between a pair of seats thus providing for storage of beverages such as soda pop and sandwiches on a hot day of fishing. The chest-type cooler is well suited to keep the beverages and food cool.

However, if one decides to move about in the boat, the chest provides a substantial inconvenience. In other words, if a person is to move past the cooler, one must step over or move around the chest. Another environment in which a chest-type cooler becomes inconvenient is in the stands or bleachers of a ball game. Fans may bring beverages such as soda pop to a ball game in a chest-type cooler. The chest may be placed in the walk-way between rows of bleachers. Here again, anyone wishing to move past such a chest must step over or encounter some difficulty in getting around such a chest. The present invention provides a cooler which is compatible for use with bench-type seats such as those found in a boat or in a set of bleachers.

GENERAL DISCUSSION OF THE PRESENT INVENTION

The cooler of the present invention overcomes the difficulties encountered by previous chest-type coolers when used in conjunction with bench-type seats. The present cooler is portable and may itself be used as a seat. The present cooler is simple in construction and convenient in use. The cooler includes a pair of spaced, preferably elongated narrow compartments and an interconnecting planar member. Each of the compartments may include a closure member desirably a hinged lid which is so situated as to avoid interference with a person sitting upon the cooler.

The cooler may be constructed of conventional materials such as styrofoam, plastic or metal materials. The simpliest of construction may be merely molded expanded styrofoam. Such construction is inexpensive. However, for durability purposes, it is desirable that the styrofoam be encased in a more rugged material such as plastic or metal. If the present cooler is provided of very solid construction, the cooler may be used in various environments including use in conjunction with a bench-type seat as well as used by itself with the side compartments serving also as leg members.

IN THE DRAWINGS

FIG. I is a perspective view of a boat including the cooler of the present invention;

FIG. II is a view of the present cooler in perspective;

FIG. III is a cross-sectional view of the cooler taken along the lines III—III in FIG. II;

FIG. IV is a top view of a portion of the cooler of the present invention taken along the line IV—IV in FIG. III;

FIG. V is a cross-sectional view along the line V—V in FIG. III;

FIG. VI is a view of the present cooler with an auxiliary drawer-type cooling compartment.

DETAILED DESCRIPTION OF THE INVENTION

The cooler 10 of the present invention may be used in conjunction with a fishing boat 11 as shown in FIG. I. The boat 11 may include a molded shell 12 of aluminum, fiberglass or other suitable material. The boat 11 may have a plurality of platform seats such as 13, 14 and 15. The cooler 10 may alternatively be used with other platform seats such as bleacher seats.

The cooler 10 as shown in FIGS. I-VI, includes a pair of compartments 18 and 19 interconnected by a planar portion 21. The compartments 18 and 19 may each include a door or closure member 22, 23 respectively.

Compartments 18 and 19 may be of similar construction. Compartment 18 includes side walls 31, 32, end walls 33 and 34, as well as, a bottom wall 35. Compartment 19 may include side walls 37, 38, end walls 39, 40 and bottom wall 41. The compartments 18 and 19 may each include a removable plug such as 42 for removing water therefrom if so desired. Plug 42 is shown in bottom wall 41 however, it may alternatively be placed in the lower portion of a side wall or end wall.

The compartment 18 may be separated internally with partition walls such as wall 43 thereby providing a plurality of chambers 44a and 44b in compartment 18. Chamber 44a may be used as a bait well for storage of live minnows while chamber 44b is used to store cold soda pop.

The compartment 19 is shown having a single chamber 45. The upper portion of compartment 19 has a circumferential lip 46 defined in walls 37-40 for support of a tray 47. The tray 47 may be of vacuum formed plastic and is provided for storage of items which may be damaged by any accumulated water in the bottom of chamber 19. Tray 47 may be used to store sandwiches, cookies and the like while soda pop is stored in the lower portion of compartment 19.

The planar portion 21 may be integral with the upper portion of walls 32 and 37 of compartments 18 and 19.

The planar portion 21 is suitable for support of a person in the sitting position. If desired, the planar portion 21 may include padding thereby providing a soft cushion. The padding may be a sheet of foam rubber such as ½ inch in thickness. The closures 22 and 23 may also be suitably padded.

The cooler 10 may further be provided with an auxiliary compartment 60 which may be slidably mounted in between compartments 18 and 19 as shown in FIG. VI. In other words, the inner walls 32 and 37 may be provided with projections or rails 61 and 62 for support of the drawer-like compartment 60. Compartment 60 includes side walls 63, 64, end walls 66, 67 and bottom wall 68. The side walls 63, 64 each have a channel 71, 72 respectively, defined therein for reception of rails 61 and 62. Cooler 10 provided with auxiliary compartment 60 may advantageously be used both as a picnic cooler when the compartment 60 is in place or as a cooler for use in conjunction with a platform seat when the compartment 60 is removed.

The entire cooler 10 if desired, may be a laminated structure including an outer rugged plastic layer 51, an inner plastic layer 52 and an intermediate insulating layer 53. The layers 51 and 52 may be any suitable plastic sheet material such as polyvinyl chloride, polystyrene, ABS (acrylonitrile-butadiene styrene), styrene or acrylic. Of course, other suitable sheet materials may be used such as thermoplastic or thermosetting sheet materials. The layers 51 and 52 may be shaped prior to forming the laminate such as by conventional vacuum forming or injection molding techniques. The layer 53 may be an insulating foam such as styrofoam. Of course, various other insulating materials may be used.

Although the present invention is shown as it relates to use in a boat, it may likewise be used in other environments such as bleacher seats, benches, canoes and the like.

I claim:

1. A portable food and beverage cooler for use in conjunction with a platform seat, said cooler comprising a pair of spaced, substantially parallel chambers and a planar portion, said planar portion interconnecting said chambers at the upper portion of said chambers, said cooler being adapted to receive a platform seat between said chambers with said planar portion being adapted for supporting engagement with said platform seat.

2. The food and beverage cooler of claim 1 wherein said planar portion is adapted for support of a person.

3. The food and beverage cooler of claim 2 wherein said planar portion is padded.

4. The food and beverage cooler of claim 1 wherein said chambers include closure means at the upper portion thereof.

5. The food and beverage cooler of claim 1 wherein at least one of said chambers includes a drain plug.

6. The food and beverage cooler of claim 1 wherein said chambers are of equal size.

7. The food and beverage cooler of claim 1 wherein said cooler includes a drawer-like compartment disposed between said spaced parallel chambers.

8. The food and beverage cooler of claim 7 wherein said chambers include means for supporting said drawer-like compartment.

9. The cooler of claim 1 wherein at least one of said chambers includes at least one compartmenting wall.

10. The cooler of claim 1 wherein at least one of said chambers has tray means supported in the upper portion thereof.